United States Patent [19]
Yao et al.

[11] Patent Number: 5,323,658
[45] Date of Patent: Jun. 28, 1994

[54] CORIOLIS MASS FLOWMETER

[75] Inventors: Hironobu Yao; Iwao Matsumoto; Masami Kishiro, all of Kawasaki, Japan

[73] Assignee: Fuji Electric Co., Ltd., Kanagawa, Japan

[21] Appl. No.: 77,606

[22] Filed: Jun. 17, 1993

[30] Foreign Application Priority Data

Jun. 19, 1992 [JP] Japan ................... 4-159924
Nov. 9, 1992 [JP] Japan ................... 4-298817

[51] Int. Cl.$^5$ ............................ G01F 1/84
[52] U.S. Cl. ............................ 73/861.37
[58] Field of Search ................ 73/861.37, 861.38

[56] References Cited

U.S. PATENT DOCUMENTS

| | | | |
|---|---|---|---|
| 4,823,614 | 4/1989 | Dahlin | 73/861.38 |
| 4,962,671 | 10/1990 | Stansfeld et al. | 73/861.37 |
| 4,972,724 | 11/1990 | Ricken | 73/861.37 |
| 5,029,482 | 7/1991 | Liu et al. | 73/861.38 |

FOREIGN PATENT DOCUMENTS

| | | |
|---|---|---|
| 60-34683 | 8/1985 | Japan . |
| 62-238419 | 10/1987 | Japan . |
| 63-34409 | 7/1988 | Japan . |

*Primary Examiner*—Richard E. Chilcot, Jr.
*Assistant Examiner*—Harshad Patel
*Attorney, Agent, or Firm*—Spencer, Frank & Schneider

[57] ABSTRACT

A Coriolis mass flowmeter which measures mass flow rate of a fluid flowing in a measuring pipe fixed to a housing, utilizing Coriolis'force generated in proportion to mass flow rate of the fluid, wherein the measuring pipe includes: a fixation portion to be fixed to the housing; a portion near the fixation portion; and a vibration canceling element attached to the housing and associated with the fixation portion, and for dynamically canceling vibration of the fixation portion of the measuring pipe, or the portion near the fixation portion of the measuring pipe. The measuring pipe may be straight, and a reinforcing member may be provided to cancel vibration of the fixation portion of the measuring pipe.

7 Claims, 9 Drawing Sheets

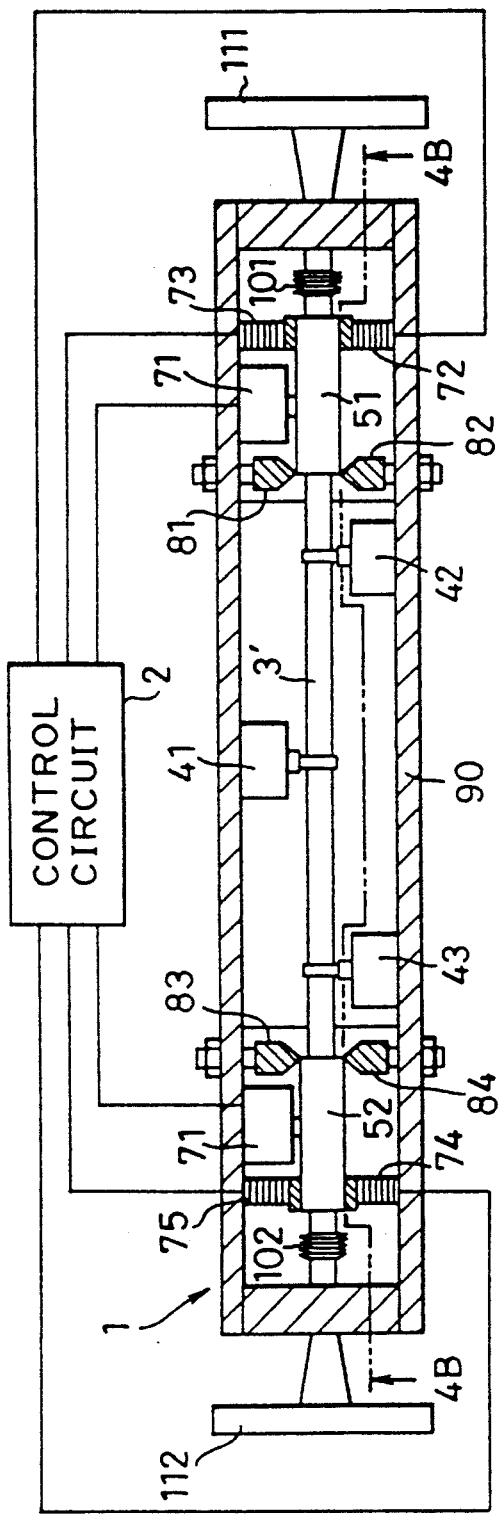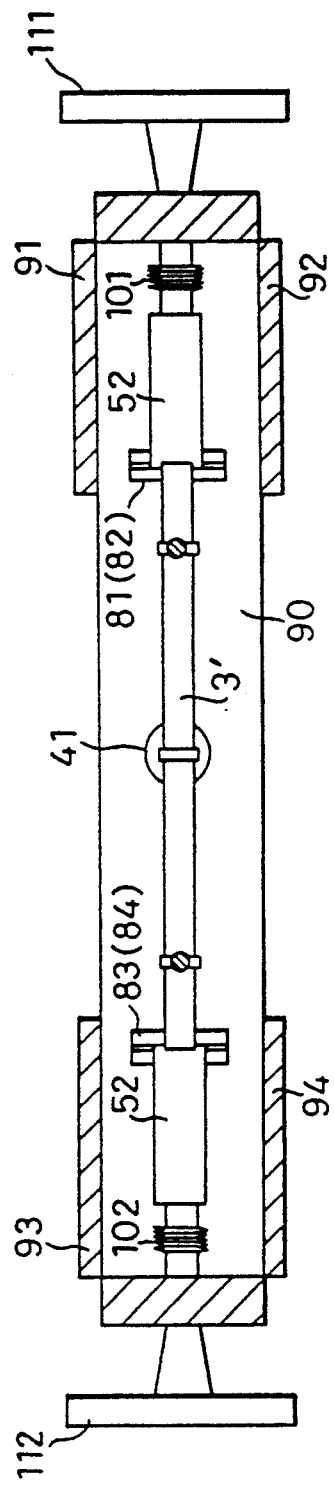
FIG. 4A
FIG. 4B

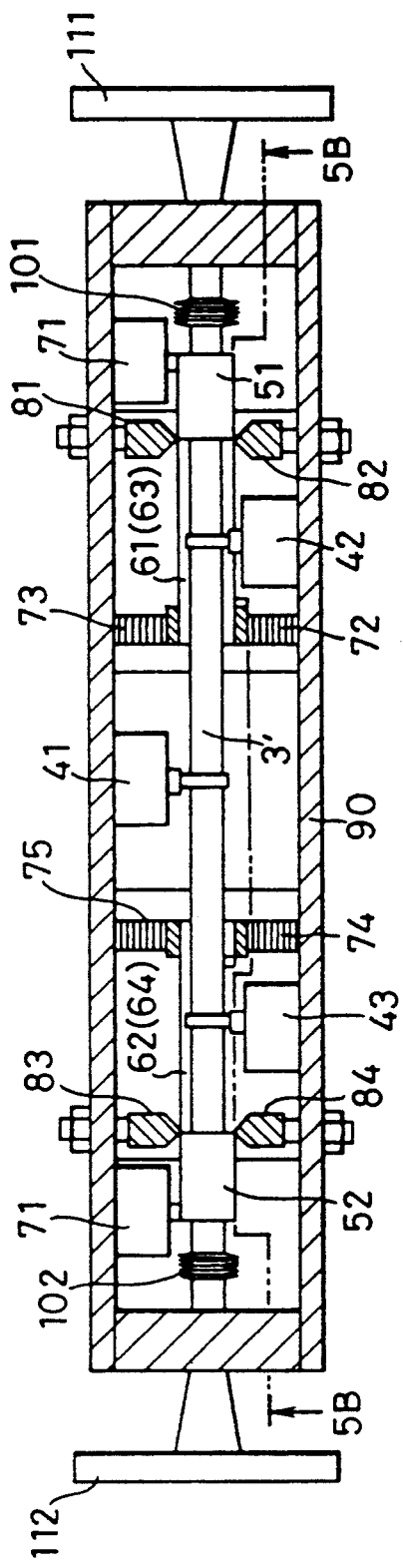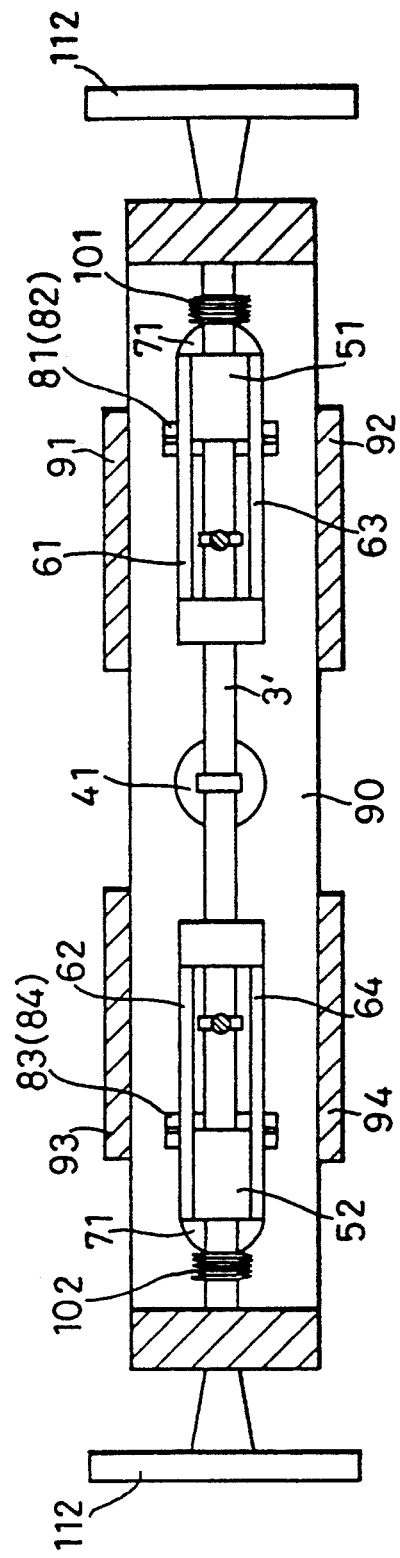
FIG.5A
FIG.5B

CORIOLIS MASS FLOWMETER

BACKGROUND OF THE INVENTION

1. Field of the Invention

The present invention relates to a Coriolis mass flowmeter which measures mass flow utilizing Coriolis' force generated in proportion to the mass flow of a fluid flowing in the vibrating pipe to be measured.

2. Description of the Prior Art

Japanese Patent Application Laying-open No. 34683/1985, corresponding to U.S. patent aplication Ser. No. 818,475, file Jul. 25, 1977, discloses an example of such a type of mass flowmeter.

FIG. 9 is a schematic perspective view showing a flow detector of a conventional Coriolis mass flowmeter. As shown in FIG. 9, a flow detector 1 includes a housing 9, to which is attached a U-shaped cantilever measuring pipe 3 as being supported at both ends 31 and 32 thereof on the housing 9, having an open side (mid portion of the pipe). Between the both ends 31 and 32 of the measuring pipe 3 there is provided a cantilever resonator 120. The measuring pipe 3 and the resonator 120 have matched resonance frequencies so that they can be resonant with each other. A driver 41 made of a coil or magnet is provided between the bottom portion 33 of the measuring pipe 3 and the tip 121 of the resonator 120. A driving circuit 130 is connected to and actuates the driver 41 so that the U-shaped measuring pipe 3 and the resonator 120 can be driven or vibrated at their resonant frequencies. Sensors 42 and 43 detect displacement of the bottom portion 33 of the U-shaped measuring pipe 3 at both sides 33a and 33b thereof where two straight portions or brackets of the measuring pipe 3 translate into the bottom portion 33. The sensors 42 and 43 may be speed sensors made of coils and magnets, respectively. Output signals from the sensors 42 and 43 are input to a signal processing circuit 140 and converted therein into flow rate signals. A fluid to be measured flows in into the cantilever U-shaped measuring pipe 3 through an inlet port a from a communication pipe (not shown). The fluid which has passed through the measuring pipe 3 flows out through an outlet port b to a communication pipe (not shown).

Let us consider a case where the flow rate of a fluid is zero. It is assumed that the U-shaped measuring pipe 3 and the resonator 120 are vibrated by the driver 41 and the driving circuit 120 at resonance frequencies. In this case, output signals with no phase difference are obtained from displacement sensors 42 and 43, which move in the same manner.

When the fluid flows, a Coriolis' force is generated in a direction perpendicular to the direction of velocity of the fluid flowing in the vibrating measuring pipe 3. Since the fluid flows in opposite directions at both ends of the U-shaped measuring pipe 3, the direction of the Coriolis' force generated at one end is opposite to that at the other end, thus giving rise to a momentum around the axis O—O in the measuring pipe 3. In other words, a torsional vibration around the axis O—O parallel of the brackets of the pipe 3 is superimposed on a deflection vibration around the axis W-W perpendicular to the axis O—O. As a result, the displacement sensors 42 and 43 issue respective outputs which can be detected with a phase difference therebetween.

Since Coriolis' force is in proportion to the mass flow rate of the fluid, the phase difference (time difference) between the output signals from the displacement sensors 42 and 43 is proportional to the mass flow rate. Hence, measurement of the phase difference (time difference) between the output signals results in measurement of the mass flow rate of the fluid.

On the other hand, the resonance frequency of the measuring pipe 3 depends on its mass (which includes the mass of the fluid in the pipe) and rigidity. In this case, the rigidity of the pipe 3 is constant and does not vary, and the density of the measuring pipe 3, which varies depending on the variation of mass, is very small, and therefore, the resonance frequency varies depending on the variation in density of the fluid to be measured in the measuring pipe 3. Accordingly, measurement of resonance frequency gives measurement of density of the fluid to be measured.

However, it is required for a Coriolis mass flowmeter to, on one hand, reduce driving power of the measuring pipe in order to minimize power consumption, and, on the other hand, stabilize the vibration of the measuring pipe in order to perform measurements of flow rate and density of a fluid with high precision. In other words, it is necessary to maintain mechanical Q of the measuring pipe at a high level. In order to maintain the mechanical Q at a high level, an effective measure is to make the part fixing the measuring pipe to have a large enough size or provide the measuring pipe with a resonator which vibrates like a tuning fork. Increasing the size of the part fixing the measuring pipe is impractical since the flowmeter becomes too heavy. On the other hand, provision of a resonator is disadvantageous in that upon variation of the density of a fluid to be measured, the resonance frequency of the measuring pipe also varies, giving rise to difference in resonance frequency between the resonator and the pipe, resulting in failure to obtain a stabilized vibration or a high enough mechanical Q.

The complicated construction of a U-shaped measuring pipe as shown in FIG. 9 has another disadvantage in that when a bubble is formed or introduced in the pipe, it tends to remain in the pipe and it is rather difficult to remove it. This adversely influences the precision of measurement, or makes washing of the measuring pipe difficult, leading to the occurrence of pressure loss.

SUMMARY OF THE INVENTION

An object of the present invention is to provide a Coriolis mass flowmeter having a high mechanical Q and giving a stabilized vibration when the density of a fluid to be measured varies.

Another object of the present invention is to provide a Coriolis mass flowmeter having a measuring pipe from which bubbles, if any, can be removed readily, which is easy to wash and susceptible to less pressure loss, gives a stabilized vibration, and enabling stabilized measurements of flow rate and density even in a reduced size and weight.

According to a first aspect of the present invention, there is provided a Coriolis mass flowmeter which measures mass flow rate of a fluid flowing in a measuring pipe fixed to a housing, utilizing Coriolis' force generated in proportion to mass flow rate of the fluid, wherein the measuring pipe comprises: a fixation portion to be fixed to the housing; a portion near the fixation portion; and a vibration canceling means attached to the housing and associated with the fixation portion, and for dynamically canceling vibration of the fixation portion of the measuring pipe, or the portion near the fixation portion of the measuring pipe.

According to a second aspect of the present invention, there is provided a Coriolis mass flowmeter having a flow rate detection part comprising: a housing; a measuring pipe which is attached to the housing and through which a fluid to be measured flows, the measuring pipe having a fixation portion and a portion near the fixation portion; a fixation part attached on one end to the housing and on another to the measuring pipe, the fixation part engaging with the fixation portion of the measuring pipe; a driving means connected to and for vibrating the measuring pipe; sensing means arranged in association with the measuring pipe and for sensing Coriolis' force generated in the measuring pipe, the sensing means sending a signal in response to the Coriolis' force measured; a flow rate signal processing circuit connected to the sensing means and for processing the signal from the sensing means; and a vibration canceling means attached to the housing and associated with the fixation portion, and for dynamically canceling vibration of the fixation portion of the measuring pipe, or the portion near the fixation portion of the measuring pipe.

Here, the vibration canceling means may comprise: a detection means attached to the housing and for detecting vibration of the fixation portion of the measuring pipe, the detection means sending a signal in response to the vibration; an actuating means attached to the housing and for actuating the fixation portion of the measuring pipe, or the portion near the fixation portion of the measuring pipe; and a control circuit connected to the actuating means for controlling, in response to the signal from the detection means, the actuating means so that the detected vibration can be canceled.

The Coriolis mass flowmeter may further comprise a supporting means attached to the housing and for supporting the fixation portion of the measuring pipe so that the fixation portion does not displace in a direction of vibration of the measuring pipe.

The actuating means may be arranged on same side as that of the measuring pipe with respect to the supporting means.

According to a third aspect of the present invention, there is provided a Coriolis mass flowmeter which measures mass flow rate of a fluid flowing in a measuring pipe, utilizing Coriolis' force generated in proportion to mass flow rate of the fluid, wherein the measuring pipe is a straight measuring pipe having fixation portions to be fixed together; and further comprising a reinforcing means attached, on one hand, to one of the fixation portions and, on another, to the other of the fixation portions, the reinforcing means canceling vibration of the fixation portions of the measuring pipe in a direction of vibration of the measuring pipe, and the reinforcing means having a flexural rigidity in a direction of vibration of the measuring pipe larger enough than flexural rigidity of the measuring pipe.

According to a fourth aspect of the present invention, there is provided a Coriolis mass flowmeter having a flow rate detection part comprising: a straight measuring pipe through which a fluid to be measured flows, the measuring pipe having fixation portions; fixation parts attached to the measuring pipe, the fixation parts engaging with the fixation portions, respectively, of the measuring pipe; a driving means connected to and for vibrating the measuring pipe; sensing means arranged in association with the measuring pipe and for sensing Coriolis' force generated in the measuring pipe, the sensing means sending a signal in response to the Coriolis' force measured; a flow rate signal processing circuit connected to the sensing means and for processing the signal from the sensing means; and a reinforcing means attached, on one hand, to one of the fixation parts, on another, to the other of the fixation parts of the measuring pipe, the reinforcing means canceling vibration of the fixation portions of the measuring pipe in a direction of vibration of the measuring pipe, and the reinforcing means having a flexural rigidity in a direction of vibration of the measuring pipe larger enough than flexural rigidity of the measuring pipe.

Here, the flexural rigidity of the reinforcing means may be at least 750 times as high as the flexural rigidity of the measuring pipe.

According to the present invention, dynamic fixation, or dynamic cancellation of vibration of fixation portion, of the measuring pipe gives rise to stabilized vibration of the measuring pipe, which enables stabilized measurement of flow rate and density of a fluid with maintaining size and weight of the flowmeter to small ones. No need for provision of a resonator secures stabilized vibration of the measuring pipe, and enables always stabilized measurements.

Further, according to the present invention, use of a straight measuring pipe and provision of a reinforcing member which cancels vibration of the measuring pipe in a direction of its vibration and which has a flexural rigidity larger than the measuring pipe allows bubbles formed or introduced in the measuring pipe to be removed readily from the measuring pipe. Thus, washing of the measuring pipe is easy and the flowmeter has a less pressure loss.

Furthermore, according to the present invention, reinforcement of the fixation portion of the straight measuring pipe gives rise to stabilized vibration of the measuring pipe. This enables stabilized measurement of flow rate and density of a fluid without increasing size and weight of the flowmeter.

The above and other objects, effects, features and advantages of the present invention will become more apparent from the following description of embodiments thereof taken in conjunction with the accompanying drawings.

BRIEF DESCRIPTION OF THE DRAWINGS

FIG. 4A is a schematic cross sectional side view showing a Coriolis mass flowmeter according to a fourth embodiment of the present invention;

FIG. 4B is a schematic cross sectional plan view taken along line 4B—4B in FIG. 4A;

FIG. 5A is a schematic cross sectional side view showing a Coriolis mass flowmeter according to a fifth embodiment of the present invention;

FIG. 5B is a schematic cross sectional plan view taken along line 5B—5B in FIG. 5A;

DESCRIPTION OF PREFERRED EMBODIMENTS

Hereinafter, the present invention will be described in more detail by embodiments with reference to attached drawings.

Embodiment 1

Figure 1A:
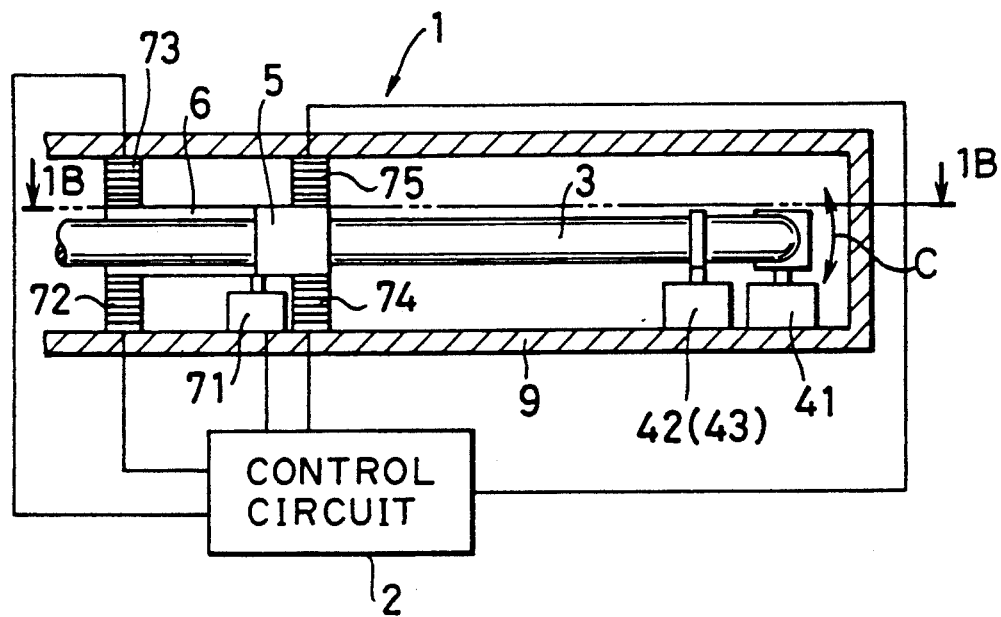
FIG. 1A is a schematic cross sectional side view showing an essential portion of a Coriolis mass flowmeter according to a first embodiment of the present invention.
Figure 1B:
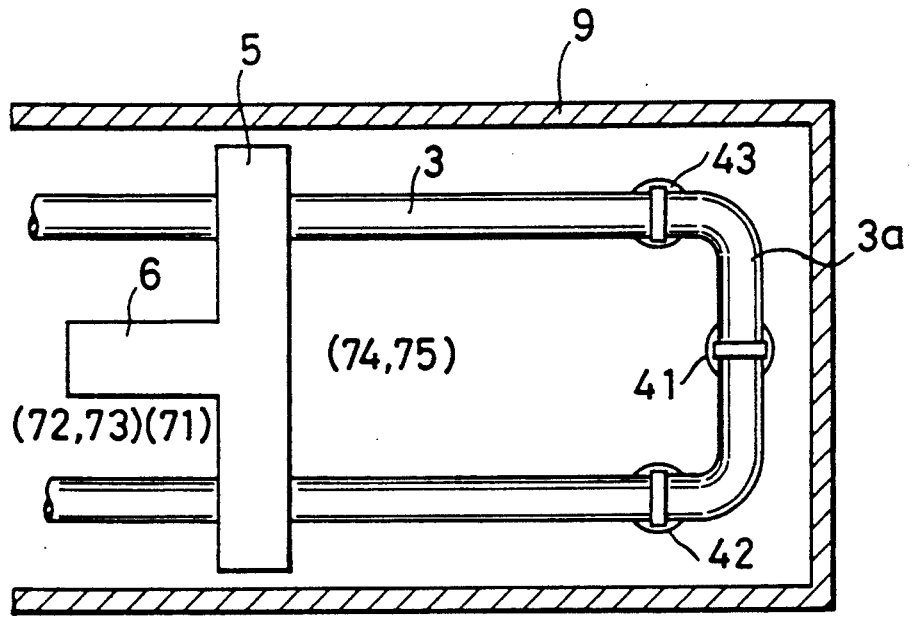
FIG. 1B is a schematic cross sectional plan view taken along line 1B—1B in FIG. 1A.

FIG. 1A is a cross sectional side view showing an essential portion of a Coriolis mass flowmeter according to a first embodiment of the present invention, and FIG. 1B is a cross sectional plan view taken along line 1B—1B in FIG. 1A. Reference numeral 1 denotes a flow rate detector, 2 a control circuit, 3 a measuring pipe, 41 a driver, 42 and 43 sensors, respectively, 5 a fixation part, 6 a lever, 71 a vibration detector, 72, 73, 74 and 75 actuators, respectively, and 9 a housing.

As shown in FIGS. 1A and 1B, a flow rate detection part 1 includes one U-shaped measuring pipe 3, on the top of which is attached a driver 41 having a magnet and a coil. On both sides of the straight portions of the U-shaped measuring pipe 3 there are attached speed sensors 42 and 43 each having a magnet and a coil. The speed sensors may be displacement sensors. A fixation part 5 is fixed to the both ends of the measuring pipe 3 to support and fix the measuring pipe 3. A lever 6 is attached to the fixation part 5 on a side opposite to a bottom portion 3a of the U-shaped measuring pipe 3. A vibration detector 71 having a magnet and a coil is attached to the fixation part 5. Laminate ceramics actuators 74, 75, and 72-73 are connected to the fixation part 5 and the lever 6, respectively. The laminate ceramics actuators 72 to 75 serve as driving means or parts. A control circuit 2 is connected to the vibration detector 71 and each of the actuators 72 to 75. The flow rate detection part 1 also includes a flow rate signal processing circuit (not shown) and a driving circuit (not shown) for driving the measuring pipe 3.

In the arrangement shown in FIGS. 1A and 1B, the measuring pipe 3 is vibrated in a direction indicated by arrow C in FIG. 1A by the driver 41 at the same resonance frequency as the measuring pipe 3. The fixation part 5 and the lever 6 connected thereto are also vibrated according to the vibration of the measuring pipe 3, and the vibration detector 71 detects this vibration and sends a signal to the control circuit 2. Then, the control circuit 2, in response to the signal from the vibration detector 71, sends signals for driving the actuators 72, 73, 74 and 75, respectively, so that the vibration of the fixation part 5 is canceled. By this anti-vibration control, the fixation part 5 behaves as if it has a much larger mass and thus may apparently be deemed to be a fixation part having a larger mass, resulting in that the measuring pipe 3 can give rise to a stabilized vibration or vibration with a high mechanical Q. According to the present invention, there is no need for providing a resonator even when the fluid to be measured in the measuring pipe 3 varies in its density, and thus causes variation in resonance frequency of the measuring pipe 3. As a result, there will occur no instabilization of vibration of the measuring pipe 3. Also, there is no need for a flowmeter to have a fixation part which has a large mass in a physical sense, and hence the flowmeter can be reduced in size and weight.

Embodiment 2

Figure 2A:
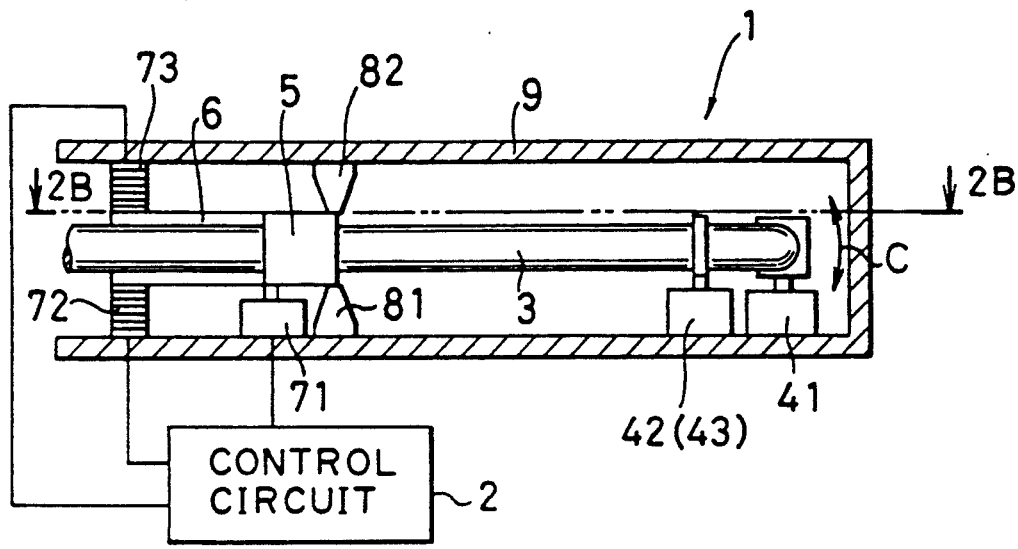
FIG. 2A is a schematic cross sectional side view showing an essential portion of a Coriolis mass flowmeter according to a second embodiment of the present invention.
Figure 2B:
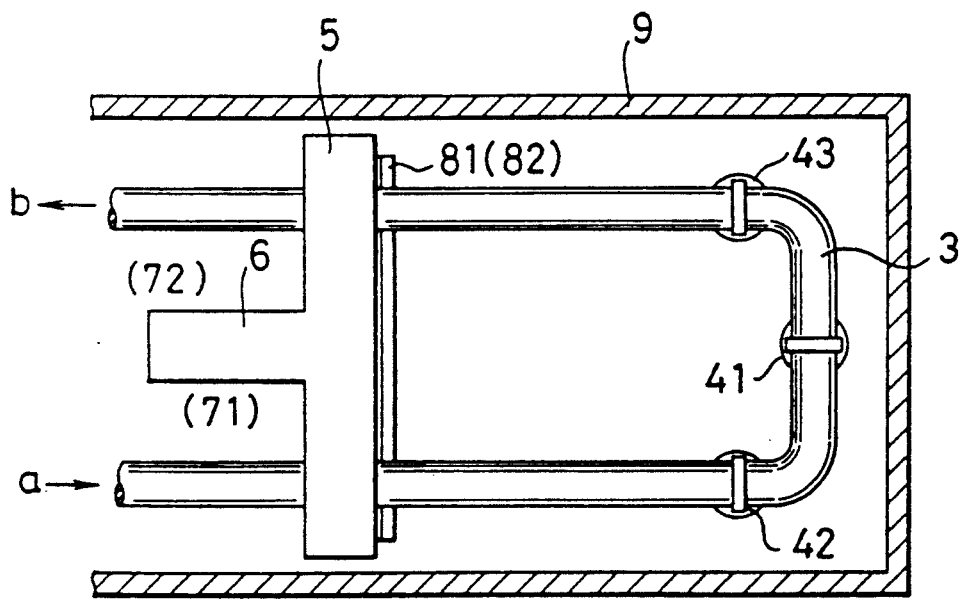
FIG. 2B is a schematic cross sectional plan view taken along line 2B—2B in FIG. 2A.

FIG. 2A is a schematic cross sectional side view showing an essential portion of a Coriolis mass flowmeter according to a second embodiment of the present invention, and FIG. 2B is a schematic cross sectional plan view taken along line 2B—2B in FIG. 2A.

The arrangement of the Coriolis mass flowmeter according to this embodiment is substantially the same as described in Embodiment 1 except that the laminated ceramics actuators 74 and 75 attached to the fixation part 5 shown in FIGS. 1A and 1B are replaced to supporting parts 81 and 82, respectively, which support the fixation part 5 so that the fixation part 5 will not move in the direction of vibration of the measuring pipe 3 as indicated by arrow C in FIG. 2A. The control circuit 2 is connected to the vibration detector 71, and the actuators 72 and 73 attached to the lever 6. This reduces the number of laminated ceramics actuators and makes control more simple, thus reducing cost.

Embodiment 3

Figure 3A:
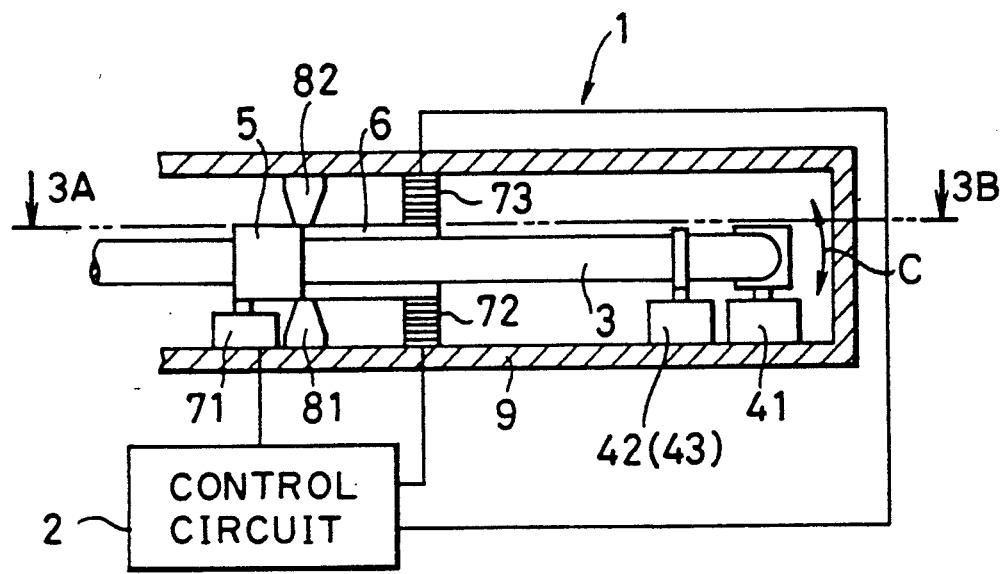
FIG. 3A is a schematic cross sectional plan view showing an essential portion of a Coriolis mass flowmeter according to a third embodiment of the present invention.
Figure 3B:
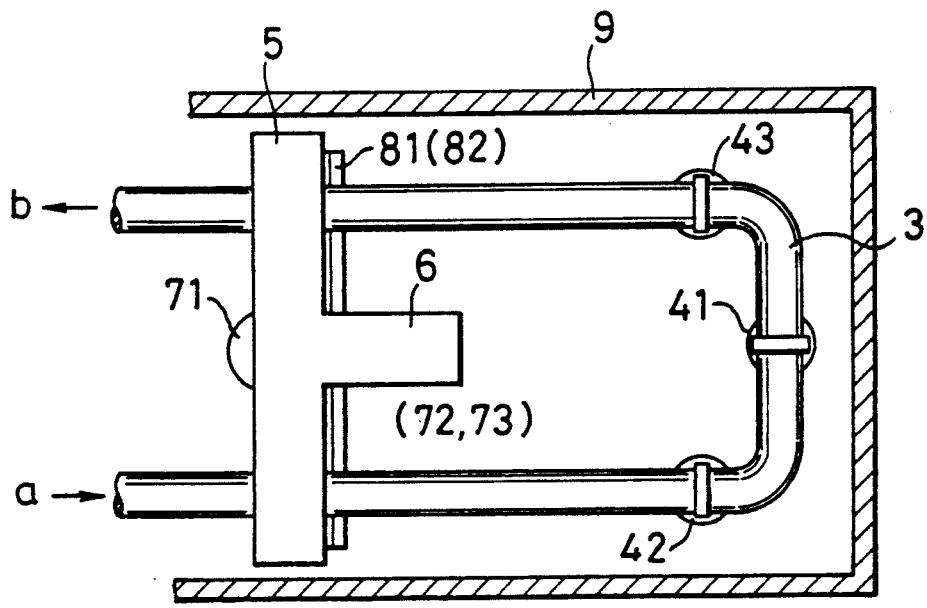
FIG. 3B is a schematic cross sectional plan view taken along line 3B—3B in FIG. 3A.

FIG. 3A is a schematic cross sectional side view showing an essential portion of a Coriolis mass flowmeter according to a third embodiment of the present invention, and FIG. 3B is a schematic cross sectional plan view taken along line 3B—3B in FIG. 3A.

The arrangement of the Coriolis mass flowmeter according to this embodiment is substantially the same as described in Embodiment 2 except that the lever 6 is provided on a side of the bottom 3a of the U-shaped measuring pipe 3, and laminated ceramics actuators 72 and 73 are attached to the lever 6. The control circuit 2 is connected to the vibration detector 71, and the actuators 72 and 73 attached to the lever 6. This arrangement reduces the overall length of the flowmeter detector 1.

Embodiment 4

FIG. 4A is a schematic cross sectional side view showing an essential portion of a Coriolis mass flowmeter according to a fourth embodiment of the present invention, and FIG. 4B is a schematic cross sectional plan view taken along line 4B—4B in FIG. 4A.

The arrangement of the Coriolis mass flowmeter according to this embodiment is substantially the same as described in Embodiment 1, 2 or 3 in that it includes a flow rate detector 1, a control circuit 2, a flow rate signal processing circuit (not shown), and a driving circuit (not shown) for driving the measuring pipe 3.

Major difference between this embodiment and the arrangements described in Embodiments 1 to 3 is that the measuring pipe 3 is a straight pipe instead of the U-shaped one.

More specifically, the flow rate detection part 1 includes a straight measuring pipe 3'. The driver 41 is attached to a middle portion of the measuring pipe 3', and the sensors 42 and 43 are attached symmetrically with respect to the driver 41. Fixation parts 51 and 52 are provided symmetrically with respect to the driver 41 and fix and support the measuring pipe 3'. The vibration detectors 71,71 are attached to the fixation parts 51 and 52, respectively. The laminated ceramics actuators 72 and 73 are attached to the fixation part 51, and the actuators 74 and 75 to the fixation parts 52. In this embodiment, there are provided supporting parts 81 and 82 for supporting and fixing the fixation part 51 on the side opposite to that where the actuators 72 and 73 are attached, and also supporting parts 83 and 84 for supporting and fixing the fixation part 52 on the side opposite to that where the actuators 74 and 75 are attached. A housing 90 is provided. The fixation parts 51 and 52 are fixed to the housing 90. Reinforcing plates 91, 92, 93 and 94 are attached to the housing 90 at both ends thereof in order to reinforce it. Bellows 101 and 102 are provided near both ends of the measuring pipe 3'. Further, flanges 111 and 112 are attached to the both ends of the flow rate detection part 1.

Embodiment D

FIG. 5A is a schematic cross sectional side view showing an essential portion of a Coriolis mass flowmeter according to a fifth embodiment of the present invention, and FIG. 5B is a schematic cross sectional plan view taken along line 5B—5B in FIG. 5A.

The arrangement of the Coriolis mass flowmeter according to this embodiment is substantially the same as described in Embodiment 4 except that in this embodiment levers 61, 62, 63 and 64 are provided on sides opposite to that of the measuring pipe 3' with respect to the fixation parts 51 and 52, and laminated ceramics actuators 72 and 73 are bonded to tips of the levers 61 and 63, and the laminated ceramics actuators 74 and 75 are bonded to tips of the levers 62 and 64. This arrangement reduces overall length of the flow rate detection part 1.

While in Embodiments 1 to 5, description has been made with reference to the use of laminated ceramics actuators as actuators, and of a vibration speed detector as having a magnet and a coil, other types of actuators other than laminated ceramics ones may be used so far as they can provide necessary force and displacement, and the vibration detector may be replaced by a displacement detector or an acceleration detector.

Embodiment 6

Figure 6A:
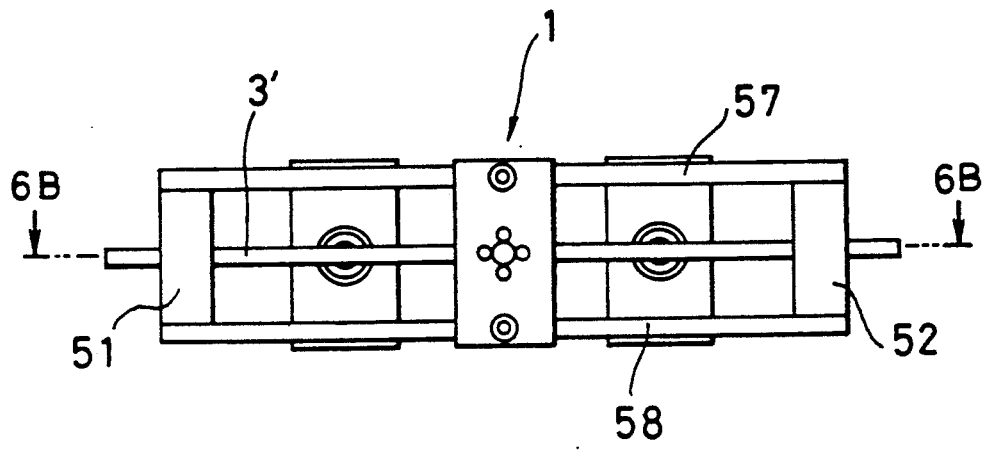
FIG. 6A is a schematic cross sectional plan view showing an essential portion of a Coriolis mass flowmeter according to a sixth embodiment of the present invention.
Figure 6B:
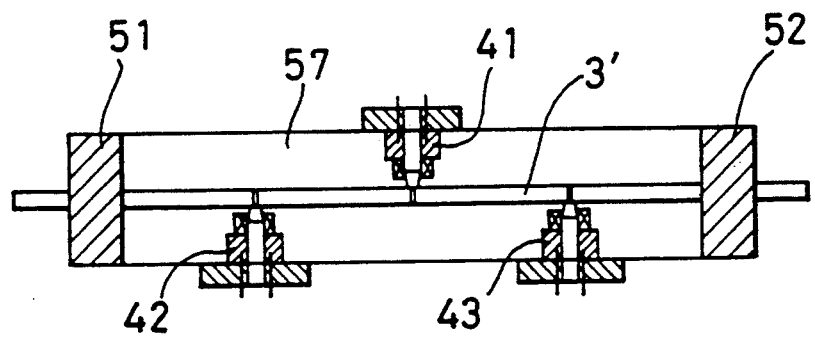
FIG. 6B is a schematic cross sectional side view taken along line 6B—6B in FIG. 6A.

FIG. 6A is a schematic cross sectional plan view showing an essential portion of a Coriolis mass flowmeter according to a sixth embodiment of the present invention, and FIG. 6B is a schematic cross sectional plan view taken along line 6B—6B in FIG. 6A.

The arrangement of the Coriolis mass flowmeter as shown in FIGS. 6A and 6B include a flow rate detection part, a flow rate signal processing circuit (not shown), and a driving circuit (not shown) for driving a measuring pipe.

As shown in FIGS. 6A and 6B, a flow rate detection part 1 includes a housing (not shown), a single straight measuring pipe 3', fixation parts 51 and 52 fixed as by brazing or welding to both ends of the measuring pipe 3' and fixed to the housing (not shown), reinforcing members 57 and 58 attached as by welding or screw to both ends of the fixation parts 51 and 52, i.e., parallel to the straight measuring pipe 3', so that vibrations of the fixation parts 51 and 52 in the direction of the measuring pipe 3' can be canceled, a driver 41 attached to a mid portion of the straight measuring pipe 3' and having a coil and a magnet, and speed sensors 42 and 43 attached to the housing and having a coil and a magnet. The speed sensors may be replaced by displacement sensors or acceleration sensors in order to detect displacement or acceleration of the straight measuring pipe 3'.

Figure 8:
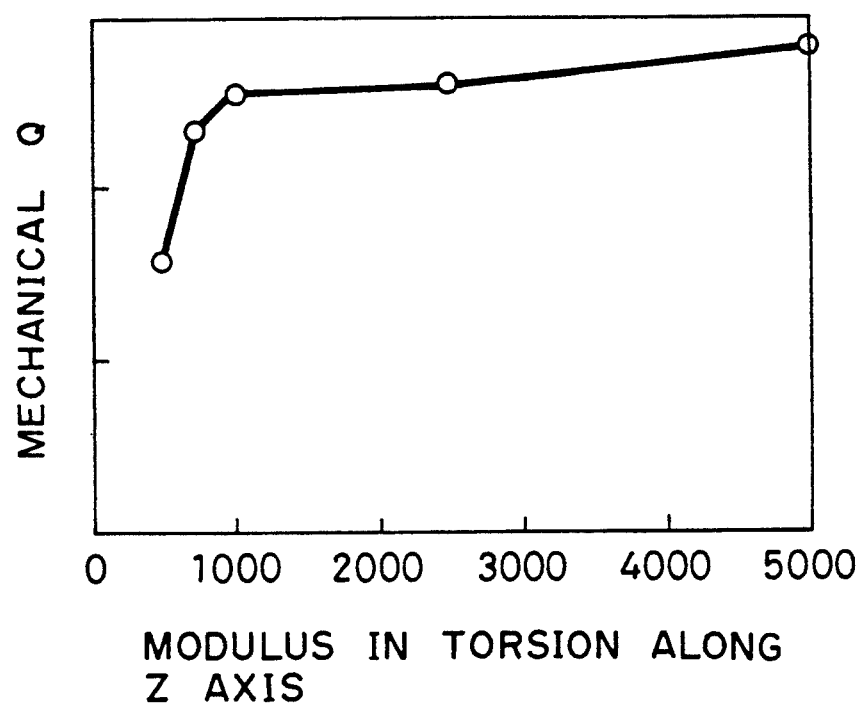
FIG. 8 is a graph illustrating a relationship between mechanical Q and modulus in torsion of the measuring pipe of a Coriolis mass flowmeter along Z axis.
Figure 9:
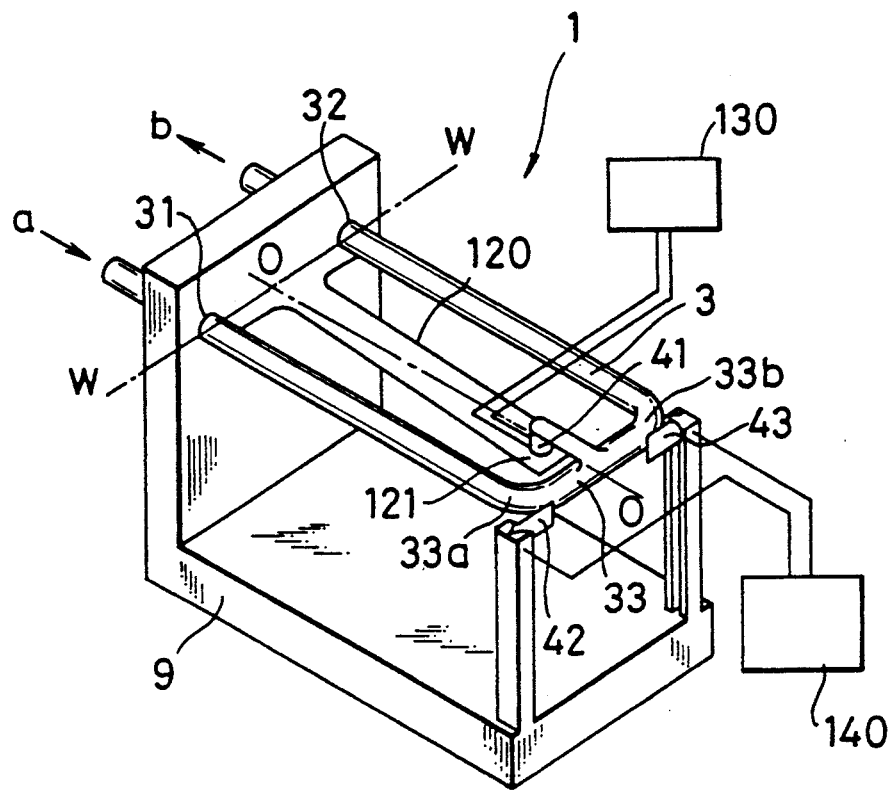
FIG. 9 is a schematic perspective view showing a conventional Coriolis mass flowmeter.

In the arrangement as shown in FIGS. 6A and 6B, and when flexural rigidity along a Z axis of the reinforcing members 57 and 58 is set up to at least 750 times, or preferably at least 1,000 times, as high as the flexural rigidity along the Z axis of the straight measuring pipe 3', the straight measuring pipe 3' gives rise to stabilized vibration with a high mechanical Q as illustrated in FIG. 8. When the flexural rigidity of the reinforcing members 57 and 58 is below 750 times as high as the flexural rigidity of the straight measuring pipe 3', it is confirmed that the mechanical Q of the straight measuring pipe 3' decreases abruptly, thus failing to give a stabilized vibration.

As described above, use of the reinforcing members 57 and 58 whose flexural rigidity along Z axis is at least 750 times, preferably at least 1,000 times, as high as the flexural rigidity of the straight measuring pipe 3' in the construction of the flow rate detection part 1 makes it possible to impart, to the reinforcing members 57 and 58, a flexural rigidity along Z axis high enough to cancel vibration along Z axis of portions serving as fixation parts 51 and 52 for fixing the straight measuring pipe 3'. As a result, energy discharge due to vibration of the fixation parts 51 and 52 can be reduced, and the flow rate detection part 1 can be arranged as a vibrating system having a high enough mechanical Q. That is, the driver 41 can supply stabilized vibration to the straight measuring pipe 3' at minimized power consumption.

When the measuring pipe 3' is vibrated by the driver 41 at resonance frequency of the pipe 3', the aforementioned arrangement of this embodiment prevents the straight measuring pipe 3' from giving instabilized vibration in the absence of a resonator even when the density of a fluid flowing through the pipe 3' varies.

Further, the arrangement of this embodiment enables reduction in size and weight of the Coriolis mass flowmeter since there is no need for fixation parts having physically large mass.

Embodiment 7

Figure 7B:
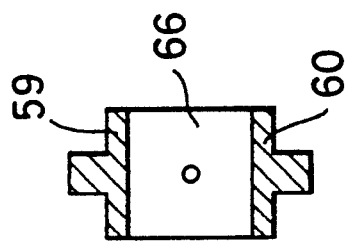
FIG. 7B is a schematic cross sectional view taken along line 7B—7B in FIG. 7A.
Figure 7A:
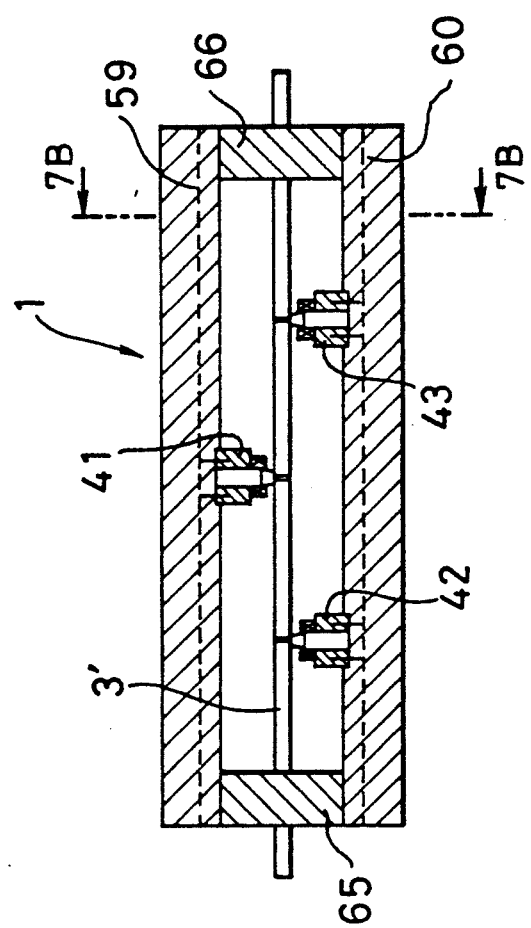
FIG. 7A is a schematic cross sectional side view showing a Coriolis mass flowmeter according to a seventh embodiment of the present invention.

FIG. 7A is a schematic cross sectional side view showing a Coriolis mass flowmeter according to a seventh embodiment of the present invention, and FIG. 7B is a schematic cross sectional view taken along line 7B—7B in FIG. 7A.

The arrangement of the Coriolis mass flowmeter in this embodiment is substantially the same as shown in FIGS. 6A and 6B except that reinforcing members 59 and 60 are attached to fixation members 65 and 66 at their upper and lower ends, or perpendicular to the direction of the straight measuring pipe 3'.

This arrangement enables provision of the drivers 41, and speed sensors 42 and 43 on the reinforcing members 59 and 60 to give a more simplified construction.

While description has been made with reference to use of a single measuring pipe, it is obvious to one skilled in the art to use more than one measuring pipes.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. In a Coriolis mass flowmeter which measures mass flow rate of a fluid flowing in a measuring pipe fixed to a housing, the flow meter having a vibrating device and a sensor device fixed to said housing utilizing a Coriolis' force generated in proportion to the mass flow rate of the fluid, wherein said measuring pipe comprises;
    a fixation portion fixed to said housing; and
    a vibration canceling means, attached to said housing and associated with said fixation portion, for detecting vibration of said fixation portion and for actuating said fixation portion in response to a detected vibration of said fixation portion to cancel the detected vibration.

2. A Coriolis mass flowmeter having a flow rate detection part comprising:
    a housing;
    a measuring pipe attached to said housing and through which a fluid to be measured flows, said measuring pipe having a fixation portion;
    a fixation part attached to said housing and to said measuring pipe, said fixation part engaging said fixation portion of said measuring pipe;
    a driving means, connected to said measuring pipe, for vibrating said measuring pipe;
    sensing means, arranged in association with said measuring pipe, for sensing a Coriolis' force generated in said measuring pipe, said sensing means generating a first signal in response to said Coriolis force measured;
    a flow rate signal processing circuit, connected to said sensing means, for processing said first signal generated by said sensing means; and
    a vibration canceling means, attached to said housing and associated with said fixation portion, for detecting a vibration of said fixation portion and for actuating said fixation portion in response to the detected vibration of said fixation portion to cancel the detected vibration.

3. The Coriolis mass flowmeter as claimed in claim 2, wherein said vibration canceling means comprises:
    a detection means, attached to said housing, for detecting vibration of said fixation portion of said measuring pipe, said detection means generating a second signal in response to said vibration;
    an actuating means, attached to said housing, for actuating said fixation portion of said measuring pipe; and
    a control circuit, connected to said actuating means, for controlling said actuating means in response to said second signal generated by said detection means to cancel said detected vibration.

4. The Coriolis mass flowmeter as claimed in claim 3, further comprising a supporting means, attached to said housing, for supporting said fixation portion of said measuring pipe so that said fixation portion does not displace in a direction of vibration of said measuring pipe.

5. The Coriolis mass flowmeter is claimed in claim 4, wherein said actuating means is arranged on same side as that of said measuring pipe with respect to said supporting means.

6. A Coriolis mass flow meter as claimed in claim 4, further comprising:
    a straight pipe serving as said measuring pipe; and
    a plurality of reinforcing means, attached to said housing, for suppressing vibration of said housing in a direction of vibration of said straight measuring pipe.

7. A Coriolis mass flowmeter as claimed in claim 5, further comprising:
    a straight pipe serving as said measuring pipe; and
    a plurality of reinforcing means, attached to said housing, for suppressing vibration of said housing in a direction of vibration of said straight measuring pipe.

* * * * *